United States Patent [19]

van Iterson

[11] 4,406,072
[45] Sep. 27, 1983

[54] COMMERCIAL FRUIT DRYING SYSTEM

[76] Inventor: Jan E. van Iterson, 7432 N. Fowler Ave., Clovis, Calif. 93612

[21] Appl. No.: 234,017

[22] Filed: Feb. 12, 1981

[51] Int. Cl.³ .............................................. F26B 3/28
[52] U.S. Cl. ........................................ 34/93; 34/237; 34/238; 47/29
[58] Field of Search ............... 34/93, 237, 238; 47/26, 47/29; 56/DIG. 2

[56] References Cited

U.S. PATENT DOCUMENTS

| | | | |
|---|---|---|---|
| 2,326,548 | 8/1943 | Mierson | 34/93 |
| 3,097,077 | 7/1963 | Melikian | 34/93 |
| 3,751,821 | 8/1973 | Olmo et al. | 34/93 |

FOREIGN PATENT DOCUMENTS 714784 9/1954 United Kingdom .................. 47/26

Primary Examiner—Larry I. Schwartz
Attorney, Agent, or Firm—Hubbard & Stetina

[57] ABSTRACT

An improved fruit drying system particularly suited for large scale commercial drying application is disclosed, comprising a plurality of substantially rigid transparent hoods, each sized to be positioned over the fruit to be dried to increase the drying effect of solar radiation and including vent means for providing convectional air flow across the fruit during the drying process. The hoods are adapted to be arranged in a side by side orientation directly within the growing field and be rapidly interlocked to one another whereby a composite hood assembly is yielded. The hood assembly forms an effective shroud over the fruit which prevents exposure of the fruit to moisture and/or animal predators during the drying process.

7 Claims, 5 Drawing Figures

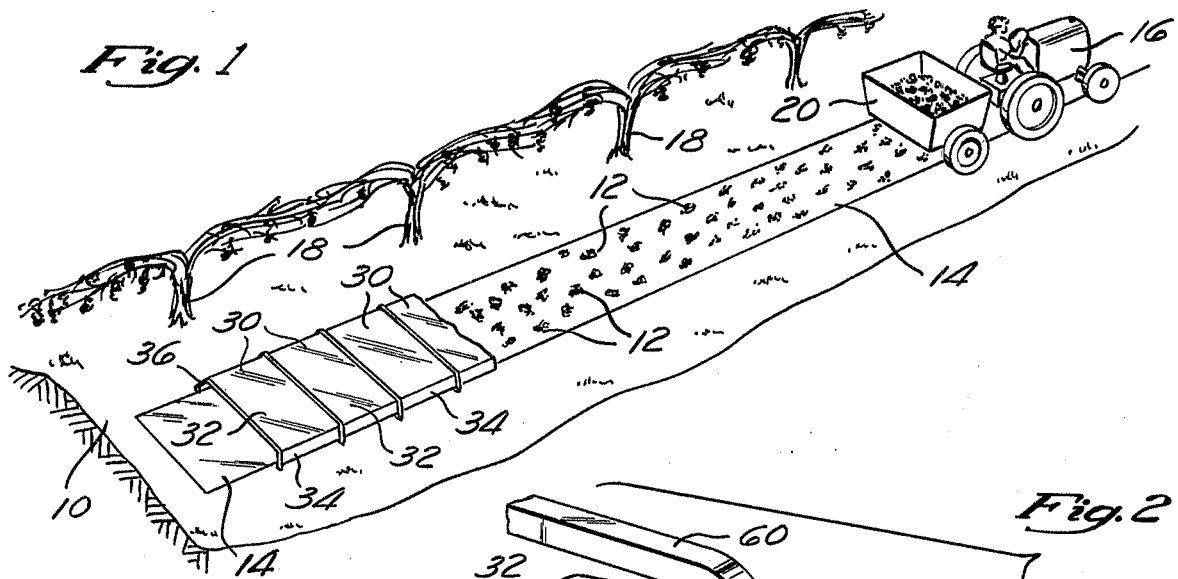
Fig. 1
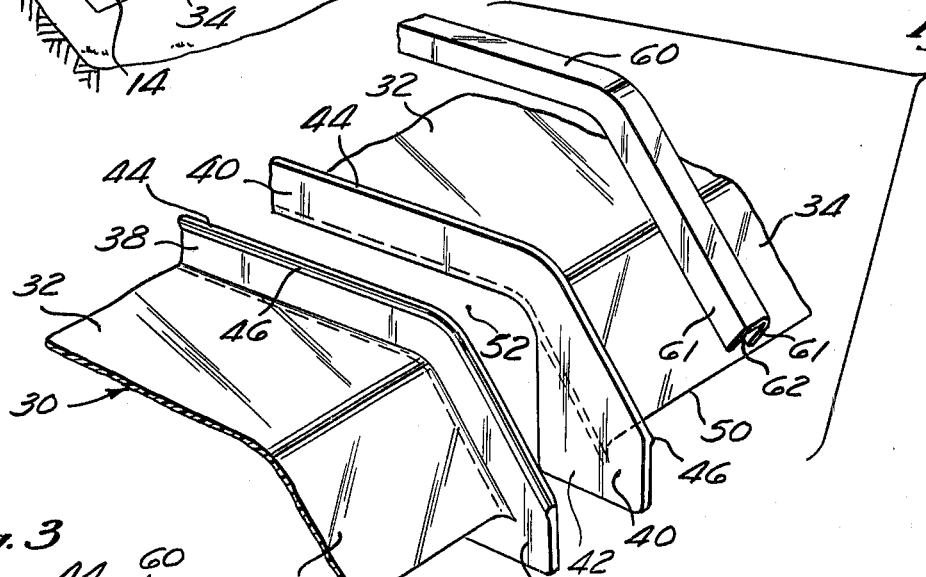
Fig. 2
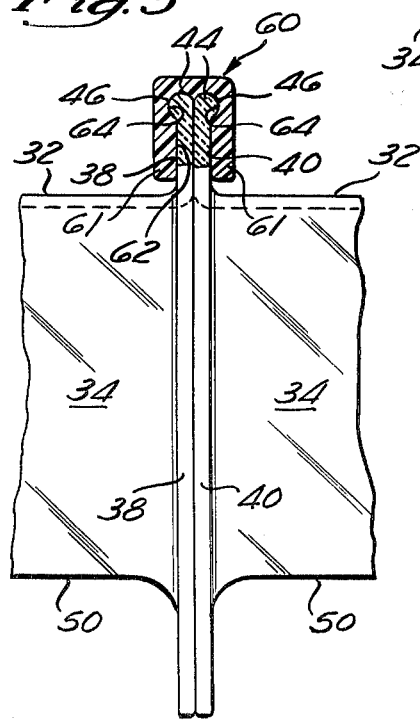
Fig. 3
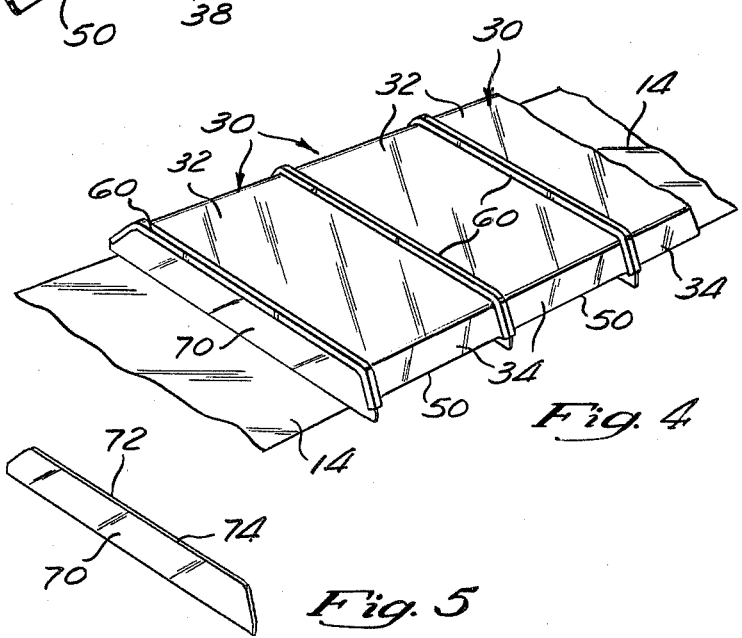
Fig. 4
Fig. 5

COMMERCIAL FRUIT DRYING SYSTEM

BACKGROUND OF THE PRESENT INVENTION

The present invention relates to solar fruit drying apparatus and more particularly to a solar fruit drying system specifically suited for large scale commercial drying applications which comprises a modification to my co-pending U.S. patent application Ser. No. 200,608, filed Oct. 24, 1980, and entitled "Improved Fruit Drying Device and Method of Drying Fruit."

It is long been known in the art to utilize solar radiation to dry fresh fruit, with the freshly picked fruit typically being layed upon a support surface and exposed directly to incident sunlight. In raisin production, for example, fresh grapes are layed upon a drying tray typically positioned between adjacent rows of grapevines within the vineyard and exposed to incident sunlight for a period of time (dependant upon weather conditions) sufficient to suitably dry the grapes into the desired raisin product.

With the advent of corporate farming in the United States large scale commercial production techniques have recently been developed to improve the production yield of dried fruit. With specific reference to raisin production, it is now common practice for large commercial vineyards to produce raisins by use of a "continuous" raisin production process. In this "continuous" process, a plastic coated paper sheet is rolled out upon the ground to extend between adjacent rows of grapevine throughout the length of the vineyard. Fresh grapes, either mechanically or hand picked from the vines, are deposited within a large hopper or accumulator which may be subsequently transported, as by way of a tractor, between adjacent rows of vines. As the hopper is transported between the rows of vines, it continuously deposits a uniform amount of grapes upon the paper tray sheet. Subsequently, the grapes are typically sprayed with a pre-drying chemical compound which promotes extractions of moisture from the grapes; and after a period of exposure to sunlight, the resultant raisin product may be packaged, and marketed to the consumer. Although this "continuous" raisin production process has proven to reduce overall labor costs associated in raisin production, there exists substantial deficiencies associated in its use.

Foremost of these deficiencies, is the exposure of grapes during the drying process to moisture such as by rain or dew, as well as to birds and other animal predators. Excessive moisture accumulating on the grapes during the drying process typically results in decay or mold forming on the grapes which is substantial, often renders the entire raisin crop unedible. Similarly, bird and animal predators often reduce crop yield by significant scavenging and further leave droppings and other debris which pose a health hazard to the ultimate consumer. In addition, the use of the pre-drying chemical sprays, although promoting more rapid fruit drying, typically break the skin of the grapes and reduce the quality of the final raisin product.

Although these above deficiencies have been recently recognized in the art, the proposed solution to date has been the use of a thin, flexible polyethylene sheet which is layed directly over the paper sheet and grapes and affixed to the soil. Although the use of such sheet coverings has partially reduced the susceptibility of the dried fruit to be exposed to moisture, it adversely effects the overall production costs of the raisin yield by requiring substantial labor costs to be expended during installation in the growing field. Additionally, such flexible sheet covering are susceptible to damage by strong winds and animal predators. Further, such sheet coverings rapidly degrade upon exposure to ultra-violet radiation which renders them unacceptable for multiple or consecutive drying applications.

Hence, there exists a substantial need in the art for a fruit drying system which is specifically adapted for large scale "continuous" raisin production applications, which safeguards against damage to the crop caused by moisture, birds and animals and may be utilized without significantly affecting labor costs, may be reused on consecutive crops from growing season to growing season, and may effectuate rapid and consistent fruit drying without the use of external artificial heat energy.

SUMMARY OF THE PRESENT INVENTION

The present invention comprises an improved fruit drying system which is specifically adapted for large scale commercial fruit drying application and which may be utilized in conjunction with the recent "continuous" raisin production technique to alleviate the above referenced deficiencies associated in the art. More particularly, the present invention comprises a plurality of substantially rigid, transparent hoods each sized to be positioned over the fruit to be dried directly within the growing field and adapted to increase the drying effect of solar radiation. The hoods include downwardly extending end panels which support the upper planer surface of the hood at an elevation raised above the fruit such that when the hoods are positioned over the fruit to be dried, a greenhouse-like environment is yielded. The greenhouse-like environment dramatically increases the effect of the solar radiation, substantially reduces the overall drying period for the fruit, and extends the period of the year in which the fruit drying process may be performed beyond the customary late summer and early fall.

In the preferred embodiment, each of the hoods are formed in a configuration suitable to be arranged in a side by side orientation directly within the growing field. With specific reference to the continuous raisin production applications, the hoods are additionally sized to span the width of the plastic coated paper sheet upon which the grapes are positioned, such that the entire sheet is covered by the plural hoods. In addition, the present invention provides means for rapidly interconnecting and interlocking adjacent hoods together in their side by side orientation, whereby a composite hood assembly is yielded which completely prevents water and/or moisture from contacting the fruit during the drying process. In the preferred embodiment, the interlocking means comprises a snap-on channel member which bridges across the interface between adjacent hoods and extends along the upper planer surface and partically down the end panel thereof. Thus, by use of the fruit drying system of the present invention, a composite hood assembly may be rapidly installed directly within the growing field which intensifies the drying effect of solar radiation, insures against moisture exposure to the fruit, and may be rapidly removed from the fruit after the drying process to permit collection of the dried fruit and storage of the hood system for future use.

Each of the plural hoods of the present invention are additionally provided with a vent or opening along its end panels which permits convectional air currents to flow across the fruit during the drying process. More particularly, during the drying process, relatively cool ambiant air enters through the vent at one end of the hood, is heated by the greenhouse-like environment beneath the hood, and subsequently travels outward through the vent formed in the opposite end of the hood. As such, during the drying operation, convectional air currents are continuously drawn across the fruit which further decreases the overall drying period for the fruit.

Further, the plural hoods of the improved fruit drying system of the present invention are condusive to being fabricated from high strength, plastic material at relatively low unit costs and may be rapidly installed in and removed from the field while incurring only minimal labor costs.

In addition, the plural hoods of the present invention include sufficient structural integrity to prevent animal and bird predators from gaining access to the drying fruit during the drying process and thus, decrease the heretofore propensity of the fruit scavenging and contamination.

Further, the present invention is specifically designed to be reused during consecutive growing seasons with the plural hoods being designed to be stowed in a convenient stacked orientation and minimize warehouse space requirements.

DESCRIPTION OF THE DRAWINGS

These as well as other features of the present invention will be more apparent upon reference to the drawings wherein;

FIG. 1 is a perspective view of the fruit drying system of the present invention being utilized in a continuous raisin production drying application;

FIG. 2 is an enlarged exploded view of a portion of a pair of plural hoods utilized in the drying system of the present invention and illustrating their construction as well as the manner in which the same are interlocked together;

FIG. 3 is an enlarged cross sectional view depicting a pair of hoods of the drying system of the present invention in their interlocked orientation;

FIG. 4 is a perspective view of one of the plural hoods of the drying system of the present invention;

FIG. 5 is a perspective view of the side panel of FIG. 4 shown removed from said hood.

DESCRIPTION OF THE PREFERRED EMBODIMENT

FIG. 1 depicts the improved fruit drying system of the present invention disposed directly within a fruit growing field 10. For purposes of illustration, the drying system of the present invention is illustrated in a commercial "continuous" raisin production application wherein bunches of grapes 12 are dried into raisins. It will be recognized, however, that the drying system of the present invention is additionally applicable to the drying of a multitude of other fruits which are conventionally solar dried.

Referring to the FIG. 1, in the large scale commercial "continuous" raisin production technique, a water resistant, plastic coated paper sheet or tray 14 is rolled out to be disposed between adjacent rows of grapevines 18 and typically extends in a direction parallel to the rows of vines 18 throughout the length of the vineyard. As is usual practice, the growing field 10 between the rows of vines 18 is furrowed, extending at a slight downward inclination from the footings of the vines 18 to facilitate proper irrigation of the vineyard. Freshly picked bunches of grapes 12 are deposited within a hopper 20 which when transported between adjacent rows of vines 18 as by way of a tractor 16, deposits a generally uniform quantity of grapes 12 directly upon the paper sheet tray 14. Disposed upon the sheet tray 17, the bunches of grapes 12 are shielded by the plastic coating on the sheet tray 14 from ground moisture and slightly inclined toward the sun so as to be exposed to the maximum amount of incident sunlight during the drying process. With the bunches of grapes 12 positioned in such a manner, the improved fruit drying system of the present invention may be rapidly installed directly within the growing field 10 to encapsulate the grapes 12 in a greenhouse-like environment and protect the grapes from atmospheric moisture and bird or animal predators.

The improved fruit drying system of the present invention is composed of a plurality of hoods 30 which as depicted in FIG. 1, may be arranged in a side by side orientation directly within the growing field 10 and interlocked together to form a composite hood assembly. Referring concurrently to FIGS. 1 and 2, the plural hoods 30 of the present invention are each formed in an identical configuration and preferably fabricated of a high strength, generally transparent, plastic material which yields a relative lightweight substantially rigid hood structure. Although a variety of plastic compounds may be effectively utilized to form the hoods 30, the applicant has found that polycarbonate materials are preferred since they do not filter ultra-violet radiation and are resistant to degradation caused by ultra-violet radiation.

Each of the hoods 30 are formed having a planer upper surface 32 and a pair of end panels 34 and 36 which extend angularly outward and downward from the planer surface 32. A pair of side members 38 and 40 are additionally provided which include an enlarged end portion 42, the heighth of which is sized to support the upper planer surface 32 of the hood 30 at an elevation raised vertically above ground surface 10. Each of the side members 38 and 40 are formed having an upper edge portion 44 which extends a short distance vertically above the plane of the upper surface 32 of the hood 30 and additionally extends a short distance above the plane of the end panels 34 and 36. A bead rib 46 extends along the distal edge and throughout the length of edge portions 42 which as will be explained in more detail infra, is adapted to permit adjacent hoods 30 to be interlocked together.

As best shown in FIG. 2, each of the end panels 34 and 36 of the hoods 30 include an elongate opening 50 along their lower most edge which define a pair of air vents at opposite ends of the hoods 30. Additionally, the side members 38 and 40 include an enlarged central cutout portion 52 which forms an elongate side opening for the hood 30. As will be discussed in more detail infra, the elongate apertures 50 on the end panels 34 and 36 permit convectional air currents to flow continuously across the fruit during the drying process while the enlarged opening 52 formed on the side members 38 and 40 allow multiple hoods 30 to be abutted in a side by side orientation without contacting or crushing the grapes 12 upon the tray sheet 14. In the preferred embodiment, the wall thickness of the upper panel 32, end panels 34 and 36, and side members 38 and 40 is sized to be approximately 3/16ths of an inch, which has been found to provide sufficient structural integrity to yield a substantially rigid hood structure.

The particular structure and manner in which multiple hoods 30 of the present invention may be interconnected and interlocked to one another may be described by reference to FIGS. 2 and 3. In the preferred embodiment, a locking member 60 is provided, which as shown, is formed as an elongate member adapted to mate with the top edge portion 44 of the side member 38 and 40. The locking member 60 is preferably formed in an inverted U-shaped cross sectional configuration (best shown in FIG. 3) having a central slot 62, the width of which is sized slightly greater than twice the thickness of the edge portion 44 of the side members 38 and 40. A pair of annular recesses 64 are provided adjacent the upper most end of the slot 62 and are sized to matingly receive the bead ribs 46 formed on the distal edge of the upper edge portions 44 of the side members 38 and 40.

By such an arrangement, when adjacent hoods 30 are positioned in a side by side orientation and abutted against one another along their side members 38 and 40, the locking member 60 may be registered with the edge portions 40 of the adjacent hoods 30 and manually pushed downward thereon such that the bead rib 46 of each of the side members 38 and 40 enters within the elongate slot 62 formed in the locking member 60. As will be recognized, during this downward movement of the locking member 60, the leg portions 61 of the locking member 60 flex a short distance outward away from the side panels 38 and 40 until the bead rib 46 of both of the side panels 38 and 40 enters into its respective annular recess 64 formed in the locking member 60. Upon entry therein, the leg portions 61 of the locking member 60 rapidly spring back to their normal unstressed position providing in effect, a snapping action which rigidly connects and interlocks the adjacent hoods 30 together. In the preferred embodiment, the locking member 60 extends along the entire length of the upper planer surface 32 of the hood as well as along a substantial portion of the height of the end panels 34 and 36. As such, when the locking member 60 is positioned on adjacent hoods 30 is completely covered by the locking member 60 whereby moisture is prevented from entering between the adjacent hoods 30.

With the structure defined, the operation of the improved fruit drying system of the present invention may be described. As previously mentioned, with the bunches of freshly picked grapes 12 being mechanically deposited upon the paper sheet tray 14, plural hoods 30 may be manually placed over the grapes 12 and arranged in a side by side orientation with the side members 38 and 40 of adjacent hoods 30 abutting one another. By positioning the hoods 30 in such a manner, opposite end panels 34 and 36 of each of the hoods 30 are maintained at differing elevations due to the furrowing of the ground 10 of the vineyard. When positioned over the grapes 12, the upper planer surface of each of the hoods 30 is maintained above the bunches of grapes 12 and prevented from contact therewith, while the elongate voids 52 formed in the central portion of the side members 38 and 40 provides sufficient space to prevent any contact with or crushing of the grapes 12 upon the tray 14. Plural locking members 60 may subsequently be manually registered at the interface of each of the plural hoods 30 and be manually pressed downward against the bead ribs 46 of each of the side panels 38 and 40 (in a manner previously described) whereby adjacent hoods are rigidly interlocked to yield a composite hood assembly. Due to the hoods 30 of the present invention completely covering or encapsulating the bunches of grapes 12, once installed in such a manner, all of the grapes 12 are completely shielded from exposure to rain or moisture throughout the drying process. Further, due to the plural hoods 30 being formed of a substantially rigid high strength plastic material, birds and other animals predators are prevented from gaining access to the grapes 12 during the drying process.

During the actual drying process, incident sunlight radiation falling upon the upper planer surface 30 of each of the hoods 10, may readily travel through the hood 30 to impinge upon the bunches of grapes 12. Upon passing through the hoods 30, the incident light rays, as well as any reflected light rays, are effectively captured beneath the hood 30, which after a short period of time, heats the air beneath the hoods 30 to a temperature substantially higher than ambient air temperature; whereby a greenhouse-like environment is yielded. During this temperature increase, heated air rises upward toward the planer surface 32 of each of the hood 30 and due to the angular inclination of the hoods 30 within the growing field 10, additionally travels transversely along the length of the hoods 30 toward the end panel 36 of each of the hood 30. Upon reaching the end panel 36, the heated air is expelled from beneath the hoods 30 and into ambiant air through the opening or vent 50 formed on the opposite each of the end panels 38.

As the heated air is expelled through the air vent in the end panels 38 of each of the hoods 30, a chimney effect is yielded which simultaneously draws relatively cool ambient air through the vent 50 formed in the end panel 36 of each of the hoods 30. Upon entry beneath each of the hoods 30, this relatively cool air is similarly heated by the incident sunlight and subsequently travels upward toward the end panels 38 to be expelled through the vent 50. Hence, by use of the drying system of the present invention, convectional air currents are continuously drawn across the grapes 12 during the drying process which in combination with the increase temperature or greenhouse affect in which the grapes are maintained, has been found to significantly decrease the overall drying time necessitated to produce the desired dried fruit product. Further, this continuous convectional air flow scavenges moisture and/or condensation released from the grapes 14 during the drying process to prevent accumulation of the same upon the inner surface of the upper planer panel 32 of each of the hoods 30.

To eliminate any possibility of moisture entering beneath the hoods 30 at the distal ends of the hood assemblies, the present invention additionally provides an detachable side panel 70 which may be selectively and rapidly connected to the particular hoods 30 located at the distal ends of the composite hood assembly. As best shown in FIGS. 4 and 5, the detachable side panel 70 is preferably formed in configurations such that when abutted against the side members 38 and 40 of the hood 30, the opening 52 formed in the side members is completely covered. In addition, the upper most edge 72 of the side panel 70 includes a bead rib 74 formed in the configuration identical to the configuration of the bead rib 64 formed on the side members 38 and 40 of the hood 30. By such a configuration, the attachable side member 70 may be positioned relative to and abutted against the side member 40 of the hood 30. Subsequently, an additional U-shaped locking member 60 may be registered along the interface of the side panel 70 and side member 40 and snapped into position in the manner previously described. By such procedure, moisture and/or animal predators are prevented from entering into the composite hood assembly from the end most hoods 30.

Once the drying process has been completed, removal of the plural hoods 30 from the field 10 may be rapidly completed by merely unsnapping and removing the plural locking member 60 from the individual hoods 30 and subsequently removing the hoods 30 from the paper sheet tray 14. Since each of the hoods 30 are formed in identical configuration, to facilitate compact storing during the dormant or fruit growing season, multiple hood 30 may be stacked vertically and nested on top of one another to minimize storage space. Further, when stacked in a vertical orientation, the upper edge portion 40 of the sidemembers 38 and 40 of the hoods 30 supports the planer surfaces 32 of each of the hoods in a vertically space relationship. Hence, any vacuum sticking between the multiple hoods in a stored condition is eliminated.

In summary, the present invention provides an improved fruit-drying system which is specifically adapted for continuous fruit drying techniques, is relatively inexpensive to produce, completely safeguards against crops damage due to moisture and/or animal predators, and may rapidly be installed directly within the growing field with only minimal labor costs.

What is claimed is:

1. A fruit drying system for commercially solar drying fresh fruit disposed upon an elongate sheet positioned within a growing field comprising:

plural hoods, formed having a top panel and a pair of end panels extending outwardly on one side of said panel, each of said plural hoods adapted to be abutted to and adjacent one of said plural hoods in a side by side orientation and be positioned upon said elongate sheet with said pair of end panels supporting said top panel of each of said plural hoods at an elevation spaced above said elongate sheet to cover said fresh fruit and define a drying chamber which said fresh fruit is disposed, said top panel of each of said plural hoods formed of a substantially transparent material which permits solar radiation to pass therethrough and heat the air within said drying chamber to a temperature sufficient to effectuate a drying of said fresh fruit;

vent means formed on each of said pair of end panels of said plural hoods for generating conventional air flow within said drying chamber in a direction generally perpendicular to the length of said elongate sheet; and means for interlocking said plural hood in said side by side orientation to form a hood assembly along the length of said elongate sheet which isolates said fresh fruit from environmental moisture during the drying of said fresh fruit;

said interlocking means comprising a locking rib extending along the length of said top panel adjacent the side portion of each of said hoods; and a channel member adapted to matingly receive an adjacent one of said locking ribs when said plural hoods are abutted in said side by side orientation.

2. The fruit drying device of claim 1 wherein said channel member releasably matingly receives said adjacent ones of said locking ribs.

3. The fruit drying device of claim 2 further comprising a said panel sized to be positioned along one side of each of said plural hoods and prevent access beneath each of said plural hoods from said one side.

4. The fruit drying device of claim 3 wherein said side panel includes a locking rib formed adjacent one edge of said side panel, said locking rib adapted to be matingly received by said channel member.

5. The fruit drying device of claim 3 wherein said plural hoods are each formed in an identical configuration.

6. The fruit drying device of claim 5 wherein said plural hoods are formed of a substantially-rigid plastic material.

7. The fruit drying device of claim 6 wherein said plastic material comprises a poly-carbonate material.

* * * * *